Jan. 3, 1967 W. L. KIBLER ETAL 3,295,564
WINDSHIELD WASHER
Filed Feb. 24, 1964 3 Sheets-Sheet 1
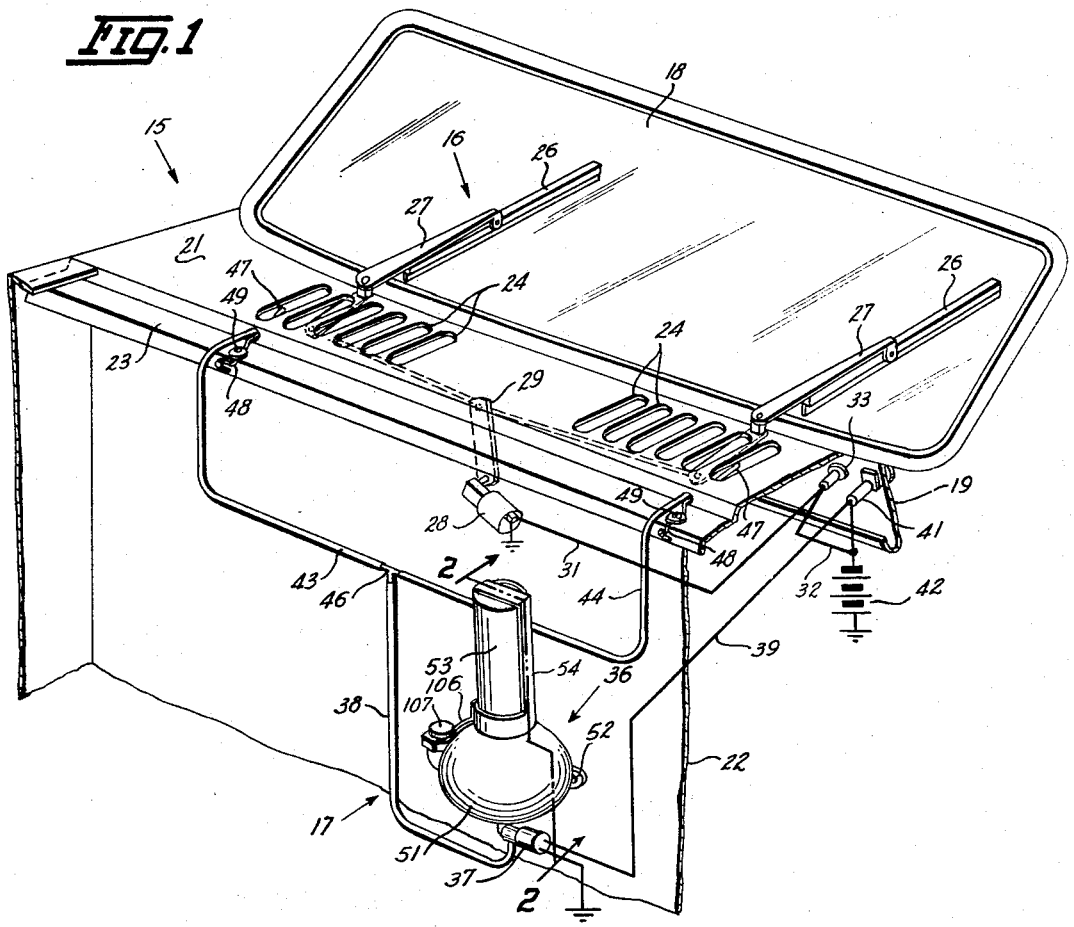
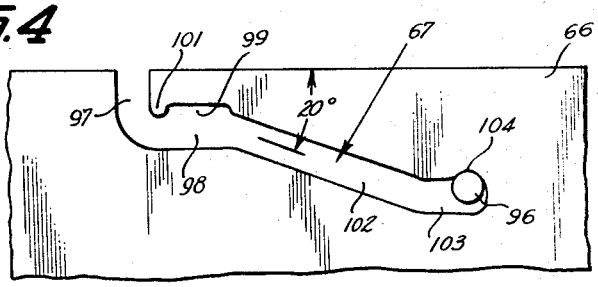
INVENTORS.
ROBERT H. OPDYKE
WILLIS L. KIBLER
BY Rudolph L. Lowell
ATTORNEY.

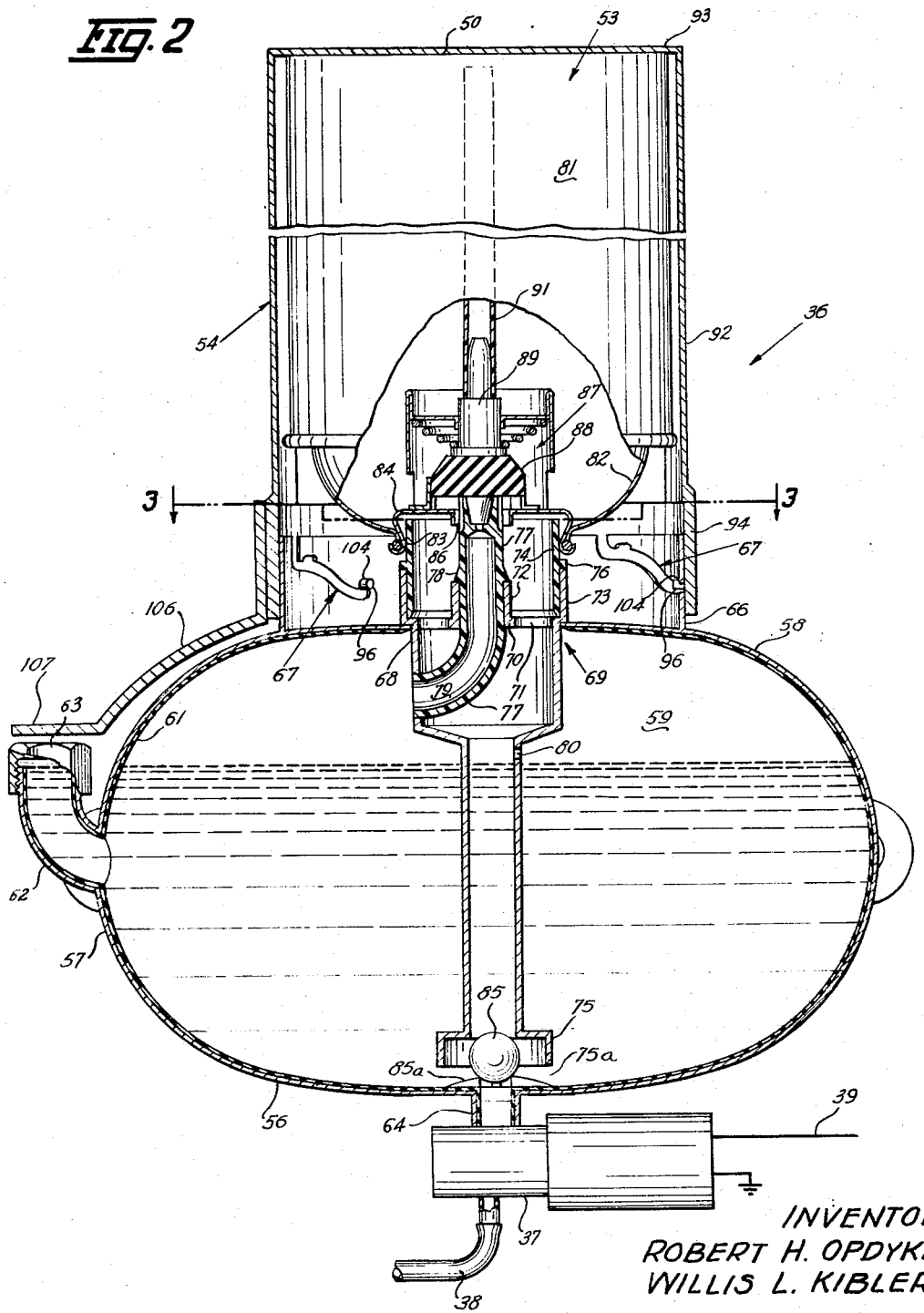

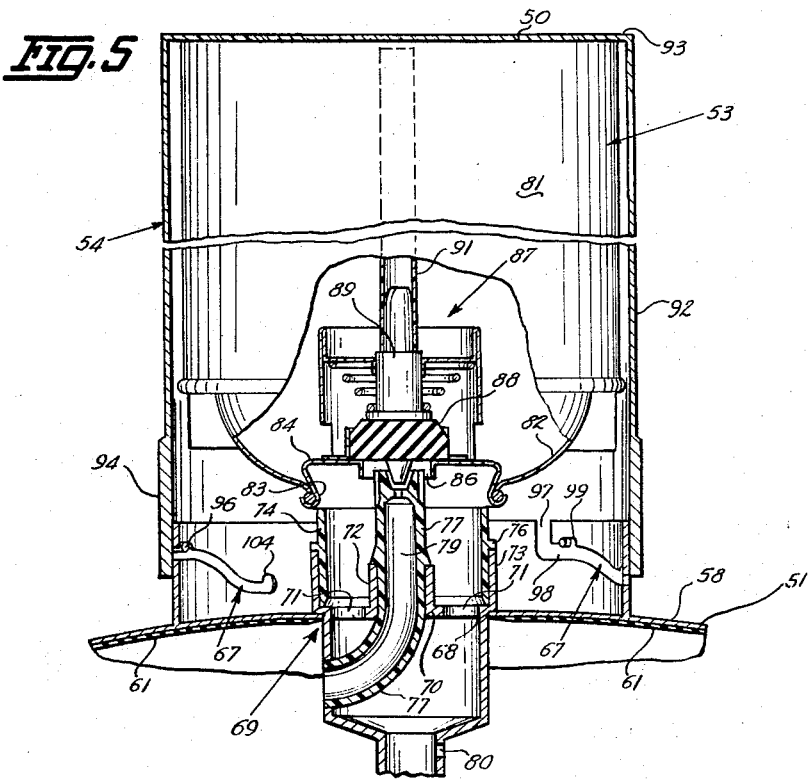
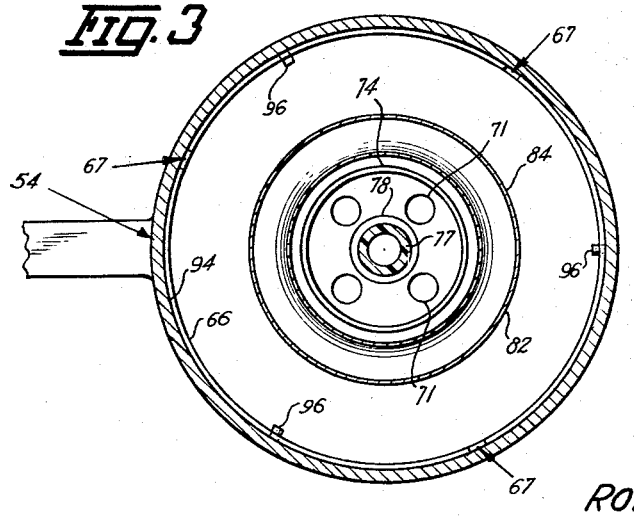

United States Patent Office 3,295,564
Patented Jan. 3, 1967

1

3,295,564
WINDSHIELD WASHER
Willis L. Kibler and Robert H. Opdyke, Detroit, Mich., assignors to The Delman Company, Cookeville, Tenn., a corporation of Tennessee
Filed Feb. 24, 1964, Ser. No. 346,900
2 Claims. (Cl. 141—18)

This invention relates to a windshield washer for vehicles and more particularly to a windshield washer having an enclosed reservoir, a disposable container for providing the reservoir with a supply of gaseous pressure, and a housing for holding the container in an assembled and sealed relation with the reservoir.

It is the object of this invention to provide an improved locking connection between a disposable container and a reservoir for holding the container in an assembled and sealed relation with the reservoir.

Another object of the invention is to provide a locking connection for a pair of fluid connected pressure chambers which eliminates accidental or unintentional separation of the pressure chambers when under superatmospheric fluid pressure.

A further object of the invention is to provide a windshield washer having a disposable solvent container and a reservoir with a housing engageable with the container and lockable with the reservoir for holding the container in an assembled relation with the reservoir and preventing the accidental separation of the container from the reservoir.

Another object of the invention is to provide a housing for holding a disposable solvent container in assembled relation with a reservoir and an arm secured to the housing for preventing the removal of the reservoir filler cap when the container is assembled on the reservoir.

An additional object of the invention is to provide a safety locking means for insuring the assembled relationship of a pair of pressure chambers which is economical in construction, and reliable and safe in use.

Further objects, features and advantages of this invention will appear from the following description and accompanying drawing, in which:

FIG. 1 is a fragmentary perspective view of a vehicle equipped with the windshield washer of the invention;

FIG. 2 is an enlarged sectional view taken along the line 2—2 of FIG. 1 showing the solvent container held in the normal lock position on the reservoir by a housing;

FIG. 3 is a sectional view taken along the line 3—3 of FIG. 2;

FIG. 4 is an enlarged detail view of the bayonet and slot connection for the reservoir and container; and FIG. 5 is a sectional view similar to FIG. 2 showing the solvent container retained in the safety lock position on the reservoir by a housing.

Referring to the drawing, there is shown in FIG. 1 a portion of a vehicle 15 equipped with a conventional windshield wiper system 16 and a windshield washer system 17 of this invention.

The vehicle 15 has an upwardly and rearwardly projected windshield 18 positioned forwardly of a dashboard 19. Positioned adjacent the lower edge of the windshield 18 is a forwardly extended cowl 21 which is secured to a downwardly directed fire wall 22. The cowl 21 is formed with a downwardly stepped front section 23 and a plurality of elongated ventilating and heater air openings 24.

The wiper system 16 includes a pair of wipers elements 26 positioned in engagement with the outside surface of the windshield 18. Arms 27 support the wiper elements 26 on the cowl 21 adjacent the forward edge of the windshield 18. The wiper elements 26 and their respective arms 27 are oscillated relative to the windshield 18 by a

2 motor 28 which is operatively connected to the arms 27 by a linkage 29.

The motor 28 is illustrated as a conventional electric unit connected by a line 31 to a manually operated switch 33 mounted on the dashboard 19. Line 32 connects the switch 33 to the vehicle's battery 42. The switch 33 is a conventional on-off unit and functions to electrically connect and disconnect the motor 28 and the battery 42. When the motor 28 is operated the linkage 29 is moved to transmit motion to the arms 27 which oscillate the wiper elements 26 over the windshield 18.

The washer system 17 comprises a cleaning fluid supply assembly indicated generally at 36 mounted on the forward side of the fire wall 22. Stored in the fluid supply assembly 36 is a quantity of windshield cleaning fluid which is subjected to a superatmospheric gaseous pressure. Connected in fluid communication with the bottom of the assembly 36 is a solenoid opearted control valve 37 which functions to regulate the flow of cleaning fluid from the assembly 36 into a hose 38. The solenoid control valve 37 is a commercial unit identified as a Skinner electric valve two-way C series type CV manufactured by the Skinner Precision Industries, Inc., New Britain, Conn.

The solenoid control of the valve 37 is connected by a lead 39 and an on-off switch 41 to a battery 42. The switch 41 is mounted on the dasboard 19 where it is readily accessible to the operator of the vehicle. When the switch 41 is in an on position the solenoid of the valve 37 is energized opening the valve 37. When the valve 37 is open the cleaning fluid under pressure in the fluid supply assembly 36 will flow through the hose 38 into hoses 43 and 44 which are connected to the hose 38 by a T-coupling 46. The ends of the hoses 43 and 44 are connected to nozzles 47 adjustably supported on the stepped section 23 of the cowl by wire nozzle support assemblies 48. Adjustable screws 49 engage the wire support assemblies 48 and function to align the nozzles 47 with one of the ventilating and heater air openings 24. Manipulation of the screws 49 adjusts the impact position of the streams of cleaning fluid dispensed on the windshield 18.

The operation of the washing system 17 is commenced on the manual actuation of the switch 41 to the on position which connects the battery 42 with the solenoid control of the valve 37. The valve 37 will remain in the open position as long as its solenoid control is energized. With the valve 37 open the cleaning fluid under pressure in the fluid supply assembly 36 flows through the hose 38 into the hoses 43 and 44 and is discharged through the nozzles 47 and deposited on the windshield 18 in the path of movement of the oscillating wiper elements 26. The duration of the dispensing of cleaning fluid on the windshield 18 is dependent on the length of time that the manually operated switch 41 is in the on position. When the switch 41 has been moved to the off position the solenoid of the valve 37 is de-energized and the valve 37 automatically closes thereby terminating the flow of cleaning fluid from the fluid supply assembly 36.

The cleaning fluid supply assembly 36 shown in FIG. 1 comprises a reservoir 51 attached to the fire wall 22 by a pair of bolt and nut assemblies 52 (one of which is shown). A disposable solvent container 53 is releasably attached to the top of the reservoir 51 by a housing 54.

Referring to FIG. 2, the reservoir 51 is a one-piece metal unit having a curved bottom wall 56, a curved upright side wall 57 and a top wall 58 enclosing a chamber 59. The reservoir 51 is formed from steel and is coated on its inner surface with a corrosion-proof lining 61. The reservoir 51 may be formed from a plastic or die cast material.

Integral with the side wall 57 is a right angle filler neck 62 projected in an upward direction and terminating below the level of the top wall 58. A cap 63 threadably engages the open end of the filler neck 62 and functions to fluid seal the opening into the chamber 59. The filler neck 62 also functions as a stand pipe to provide a foolproof water level for the reservoir 51. When this level is attained any additional water supplied to the filler neck 62 will merely overflow therefrom.

The valve 37 is connected in a fluid communicating relation with the chamber 59 by a coupling 64 secured to the central area of the bottom wall 56. The coupling 64 supports the valve 37 and its control solenoid on the reservoir 51.

Mounted on the top wall 58 of the reservoir 51 is an upright locking ring 66. Formed in the locking ring 66 are a plurality of downwardly and circumferentially directed slots 67 the purpose of which will be subsequently described in detail.

The central section of the top wall 58 of the reservoir 51 is formed with a circular opening 68 into which is seated a metal tube or support member 69 of an annular shape. The tube 69 includes a disc 70 formed with a plurality of holes 71 and inner and outer concentric annular upright walls 72 and 73, respectively.

The outer wall 73 has an enlarged top section secured to the reservoir top wall 58. The body of the tube 69 projects downwardly into the reservoir terminating adjacent the bottom wall 56 in an inverted cup-shaped end 75 which with the bottom wall 56 forms a passage 75a for the movement of liquid from the tube into the reservoir. The top portion of the tube 69 has a hole 80 providing gas communication between the inside of the tube and chamber 59.

Positioned within the cup-shaped end 75 of the tube 69 is a ball 85 of a diameter larger than the body of the tube. A plurality of spaced ribs 85a on the reservoir bottom wall 56 adjacent the opening for the coupling 64 prevents the ball 85 from closing this opening. The ball 85 on a reduction of pressure in the tube 69 will move upwardly into a sealing relation with the side wall of the body of the tube 69 and thereby prevent the liquid in the reservoir from moving up in the tube.

A cylindrical sleeve 74 formed from a plastic material is telescoped within the outer upright annular wall 73 and has an annular peripheral rib 76 which engages the top of the annular wall 73. The sleeve 74 is of a diameter to form a tight fit with the upright annular wall 73 providing a fluid sealed relationship between the annular wall 73 and the sleeve 74.

An upright tubular member 77 is seated in the hole formed by the inner annular wall 72 and projects upwardly in axial alignment with the cylindrical sleeve 74. The tubular member 77 has an integral peripheral rib 78 about its mid-section which engages the top of the annular wall 72 to define the assembled position of the tubular member 77 with respect to the annular wall 72. Extended longitudinally through the tubular member 77 is a passage 79 which opens into the chamber 59. The bottom section of the tubular member 77 is curved and projects through a hole in the upper section of the tube 69. The outer peripheral surface of the bottom section of member 77 is in a sealed relation with the tube 69.

The container 53 is shown in FIG. 2 in an inverted position and has a cylindrical side wall 81 and convex-shaped top wall 82 formed with a central circular opening 83. A cup-shaped metal cap 84 having a central hole 86 is assembled on the top wall 82 within the hole 83.

Mounted on the inside of the cap 84 is a valve assembly indicated generally as 87 operable to open and close the hole 86. The valve assembly 87 comprises a pair of concentrically mounted valves 88 and 89 which are sequentially actuated to provide both gas and liquid communication between the container 53 and the reservoir 51. A plastic hose 91 is connected to the inner valve 89 and terminates adjacent the bottom wall 50 of the container 53. The specific details of the valve assembly 87 form part of the subject matter of applicants' co-pending U.S. patent application Serial No. 349,775 filed March 5, 1964 now Patent No. 3,260,284.

The container 53 is a disposable item used to package a liquid solvent which fills approximately 70% of the volume of the container. A gas under superatmospheric pressure occupies the remaining 30% of the volume of the container. The specific liquid solvent and gas in the container and the inter-action of the solvent and gas with water or a second liquid in the reservoir 51 is disclosed in applicants' co-pending U.S. patent application Serial No. 349,775 filed March 5, 1964.

FIG. 2 shows the container 53 inverted and in assembled relation with the reservoir 51 with the cap 84 positioned about the cylindrical sleeve 74 in a fluid sealed relationship. The upright tubular member 77 on relative axial movement between the reservoir 51 and container 53, as will be hereinafter described functions to sequentially open the valves 88 and 89 to provide first a gas communication between the container and the reservoir and then a subsequent liquid communication between the container 53 and reservoir 51.

The inner valve 89 is first opened by the tubular member 77 to connect the passages 79 with the passage in the flexible hose 91 thereby connecting the gas under pressure adjacent the bottom wall 50 of the container 53 with the chamber 59 of the reservoir 51. The tubular member 77 subsequently coacts with the valve 88 to provide liquid communication between the container and the bottom of the reservoir 51. The liquid in the container 53 flows under the valve 88 through the hole 86 in the cap 84 and through the hole 71 in the tube 69 into the bottom of the reservoir chamber 59.

As the level of the liquid solvent in the container 53 is lowered, gas in the chamber 59 flows through the valve 89 and flexible tube 91 into the container 53. Thus with the gas replacing the liquid in the container 53, the liquid in the container will continue to flow into the reservoir 51 as long as the valve 88 is open.

The container 53 is held in an assembled position on the reservoir 51 by the housing 54 which comprises an inverted U-shaped strap 92 having a length greater than the height of the solvent container 53. The top of the strap 92 extends diametrically across the bottom of the container 53 and engages the peripheral edge of the bottom wall 50 of the solvent container 53. The legs of the strap extend downwardly adjacent the sides of the container 53.

The lower section of the casing has an enlarged cylindrical section 94 secured to the lower ends of the U-shaped strap 92. The diameter of the cylindrical section 94 is slightly larger than the diameter of the locking ring 66 attached to the top wall 58 of the reservoir 51. When the housing 54 is assembled on the reservoir 51 the inner peripheral surface of the cylindrical section 94 is in surface engagement with the outer peripheral surface of the ring 66 so as to align the housing 54 on the reservoir 51. The housing 54 is locked in an assembled relation with the ring 66 by a plurality of inwardly directed bayonets or studs 96 secured to the liner 94 and insertable within corresponding slots 67.

As shown in FIG. 3, the locking ring 66 is provided with three slots 67 which are spaced from each other in a circumferential direction. The slots 67 are not equally spaced from each other. The circumferential space between adjacent slots differs about five degrees so that the housing 54 can only be assembled on the reservoir in one position. Each slot has an arcuate length of approximately 48 degrees. The number and circumferential spaced relation of the studs 96 correspond to the number and circumferential spaced relation of the slots 67 in the locking ring 66.

Since the slots 67 are identical in configuration only one thereof is specifically illustrated in FIG. 4. A slot 67 has a downwardly directed section 97, open to the top edge of the ring 66, and of a width substantially equal to the diameter of a stud 96. Joined with the lower end of the section 97 is a safety lock section 98 extended circumferentially in a direction substantially normal to the downwardly directed section 97. The safety lock section 98 is of an increased width relative to the section 97 and has a downwardly extended projection 101 at its junction with the section 97 so as to form a recess 99 which extends in a circumferential direction substantially parallel to the top edge of the ring 66 and has a length which is approximately twice the diameter of the stud 96.

The safety lock section 98 opens into a downwardly inclined section 102 which leads to a lock section 103. The inclined section 102 extends downwardly at an angle of approximately 20 degrees relative to the top edge of the ring 66. The safety lock section 103 extends in a circumferential direction substantially parallel to the top edge of the ring 66. The sections 102 and 103 are of a width substantially equal to the width of the section 97, with the terminating end of the lock section 103 having an upwardly directed semi-circular lock recess 104 of a radial dimension substantially equal to the radius of the stud 96.

In order to prevent the removal of the filler cap 63 when the fluid in the reservoir 51 is under pressure, an arm 106 having a hand 107 is positioned adjacent the top of the cap 63 when the housing 54 is locked on the reservoir 51. As shown in FIG. 2, the arm 106 is secured to the side of the cylindrical section 94 of the housing 54 and extends laterally and curves downwardly toward the cap 63. The outer end section or hand 107 of the arm 106 is flat and is directly above the top of the cap 63. The hand 107 functions as a stop preventing the removal of the cap 63 when the housing 54 is locked on the reservoir 51.

As shown in FIG. 5, the housing 54 is axially aligned with the locking ring 66 on the reservoir 51 with the cylindrical section 94 in a telescoped relation with the ring 66. The studs 96 are positioned in the recesses 99 of the safety lock sections 98. Movement of the studs 96 to this position was obtained by initially aligning and moving the studs through the downwardly directed sections 97 and then rotating the housing 54 until the studs passed under the downwardly directed projections 101. With the housing 54 in this safety lock position the cap 84 of the container 53 is in alignment with the plastic sleeve 74 on the reservoir 51. As a result of this axial movement of the container 53 relative to the container 51 the cap 84 is spaced from the sleeve 74 whereby the reservoir chamber 59 is momentarily vented to the atmosphere to release the gas pressure which tends to urge the container 53 away from the reservoir.

Continued rotation of the housing 54 moves the studs 96 into the inclined sections 102 with the result that the container 53 is again moved in a downward direction relative to the reservoir 51. This downward movement of the container 53 forces the cap 84 into a sealing relationship with the peripheral surface of the sleeve 74 and moves the valve assembly 87 into engagement with the tubular member 77 to sequentially open the valves 88 and 89.

Further rotation of the housing 54 seats the studs 96 in the semi-circular lock recesses 104, as shown in FIG. 2. In this position the container 53 is in the assembled position on the reservoir 51 with the valves 88 and 89 functioning to provide both gas and liquid communication between the container 53 and the reservoir 51. The gaseous pressure in the container 53 and the reservoir 51 tends to seperate the container 53 from the reservoir 51. This separating action holds the studs 96 in the upwardly directed recesses 104 thereby preventing relative rotation between, and accidental separation of, the container from the reservoir 51. The arm 106 is positioned adjacent the top of the cap 63 thereby preventing the removal of the cap 63 when the liquid in the reservoir 51 is under pressure.

When the supply of windshield cleaning fluid in the reservoir 51 has been exhausted, the disposable container 53 is removed from the reservoir by rotating the housing 54 in a direction to remove the studs 96 from the slots 67. Initially the housing 54 is turned until the studs 96 are positioned in the safety lock recess 99 as shown in FIG. 5. In this position pressure in the reservoir 51 and the container 53 will separate the cap 84 from the sleeve 74 breaking the seal between the container 53 and the reservoir 51. This results in the venting of the superatmospheric pressure in the chamber 59 of the reservoir 51 to the atmosphere, prior to the movement of the studs 96 into the slot sections 97, whereby to prevent the container 53 being blown off or ejected from the reservoir 51. Thus, when the studs 96 are in the slot sections 97 the container 53 and the housing 54 may be safely removed from the reservoir 51.

After the reservoir 51 has been refilled with a cleaning liquid, such as water, to a level determined by the filler neck 62, a replacement solvent container similar to the container 53 is assembled on the reservoir 51 as described above.

In summary the washer system of this invention has an improved locking connection between a disposable container 53 and a reservoir 51 for storing a predetermined quantity of washing liquid. The locking connection includes a housing 54 for holding the container in an assembled and sealed relation with the reservoir. A specific bayonet and slot means formed by slots 67 and studs 96 functions to prevent the accidental separation of the container from the reservoir. The slots 67 have safety lock recesses 99 and circumferentially spaced lock recesses 104. When the studs 96 are positioned in the safety lock recesses 99 the container is held against separation from the reservoir 51 while the reservoir chamber 59 is in fluid communication with the atmosphere. When the studs 96 are seated in the lock recesses 104 the container 53 and reservoir 51 are held against separation in a sealed and fluid communicating relationship. An arm 106 secured to the housing 54 prevents the reservoir fill cap from being removed when the studs 96 are in the lock recesses 104.

While there have been shown, described, and pointed out the fundamental novel features of the invention it is to be understood that various omissions, substitutions, changes in forms and details of the washer system illustrated may be made by those skilled in the art, without departing from the scope of the invention which is to be limited only as indicated by the appended claims.

We claim:
1. In combination,
   (a) container means for storing a liquid solvent under gaseous pressure,
   (b) valve means on said container for controlling the flow of solvent therefrom,
   (c) reservoir means for storing a cleaning liquid, said reservoir means having an inlet opening closed with a removable cap,
   (d) means on said reservoir means engageable with said container means and said valve means to fluid seal said container means with said reservoir means and to open said valve means,
   (e) housing means engageable with said container means and reservoir means for holding the container means in an assembled relation with the reservoir means,
   (f) coacting means on said housing means and reservoir means operable to releasably attach the housing means to the reservoir means and to selectively position the container means in a fluid sealed or a nonfluid sealed relation with the means on the reservoir means, and
   (g) arms means secured to said housing means and positionable adjacent said cap on the reservoir means when the container means is in a fluid sealed rela- tion with the reservoir means for preventing the removal of the cap from the reservoir means.

2. In combination,
(a) container means for storing a liquid solvent under gaseous pressure,
(b) valve means on said container for controlling the flow of solvent therefrom,
(c) reservoir means for storing a cleaning liquid, said reservoir means having an inlet opening closed with a removable cap,
(d) means on said reservoir means engageable with said container means and said valve means to fluid seal said container means with said reservoir means and to open said valve means,
(e) housing means engageable with said container means and reservoir means and movable to hold the container means in an assembled relation with the reservoir means,
(f) ring means secured to said reservoir means for aligning the housing means on the reservoir means, said ring means having at least one slot formed with a safety lock recess and a circumferentially spaced lock recess,
(g) stud means secured to said housing means, said stud means positionable in said slot and movable between the safety lock recess and the lock recess in response to movement of the housing means relative to the ring means, said housing means positioning said container means in a non-sealed and non-fluid communicating relationship with the reservoir when the stud means is in the safety lock recess and positioning said container means in a sealed relationship with the reservoir and engaging the valve means with the means on the reservoir means to open the valve means and establish fluid communication between the container means and reservoir means when the stud means is in the lock recess, and
(h) arm means secured to said housing means and positionable adjacent said cap when the stud means is positioned in the lock recess for preventing the removal of the cap from the reservoir means.

References Cited by the Examiner
UNITED STATES PATENTS

| | | | |
|---|---|---|---|
| 1,845,882 | 2/1932 | Litschge | 285—361 |
| 2,627,857 | 2/1953 | Marcelli | 141—330 X |
| 2,648,533 | 8/1953 | Ulrich | 285—361 X |
| 3,109,558 | 11/1963 | Yetter | 141—3 X |

FOREIGN PATENTS 1,079,927　5/1954　France.

LAVERNE D. GEIGER, *Primary Examiner.*

E. J. EARLS, *Assistant Examiner.*